Aug. 13, 1935.　　　　O. WITTEL　　　　2,011,350

CONTROL ARRANGEMENT FOR A MOTION PICTURE CAMERA

Filed July 30, 1932

Otto Wittel,
Inventor:

By Newton M. Perrins
George A. Gillette, Jr.
Attorneys

Patented Aug. 13, 1935

2,011,350

UNITED STATES PATENT OFFICE 2,011,350

CONTROL ARRANGEMENT FOR A MOTION PICTURE CAMERA

Otto Wittel, Rochester, N. Y., assignor to Eastman Kodak Company, Rochester, N. Y., a corporation of New York Application July 30, 1932, Serial No. 626,918

13 Claims. (Cl. 88—17)

The present invention relates to a motion picture camera and more particularly to a magazine type of motion picture camera in which control means supervise the operation of the camera.

It has been previously proposed to construct a magazine type of motion picture camera in which the magazine is attached to the camera by a locking means cooperating with a shutter for openings in the magazine so that the magazine cannot be removed from the camera without first closing the shutter to prevent any accidental or unnecessary fogging of film in the magazine. It has not been recognized, however, that movement of the shutter for the magazine openings may also lock the mechanism of the camera to prevent its operation while the magazine is not in place.

The primary object of the present invention is the provision of a member associated with the clutch means controlling the prime mover for the camera, said member being adapted to assume two positions, each corresponding to the open or closed positions of the shutter on the magazine, this member cooperating with the clutch means for controlling the operation of the camera to prevent operation when the magazine shutter is closed and also cooperating with the magazine to prevent its removal when the shutter is open. Another object of the present invention is the provision of a member for preventing disengagement of the clutch means for operation of the camera when the magazine is not in place and which is ordinarily inaccessible to the operator of the camera. Other objects of the invention will be suggested to those skilled in the art as the disclosure of my invention proceeds hereinafter.

The above and other objects of the invention are attained by the provision of a member in a motion picture magazine camera having one portion which is operated by movement of the shutter, having another portion which cooperates with the clutch means of the camera to prevent its operation in a position of the member which corresponds to the closed position of the magazine shutter, and having still another portion which is adapted to engage a locking aperture in the magazine and prevent displacement or removal of the magazine while the magazine shutter is in open position.

Reference is hereby made to the accompanying drawing in the several views of which similar reference numerals designate similar elements and in which.

Figure 2:
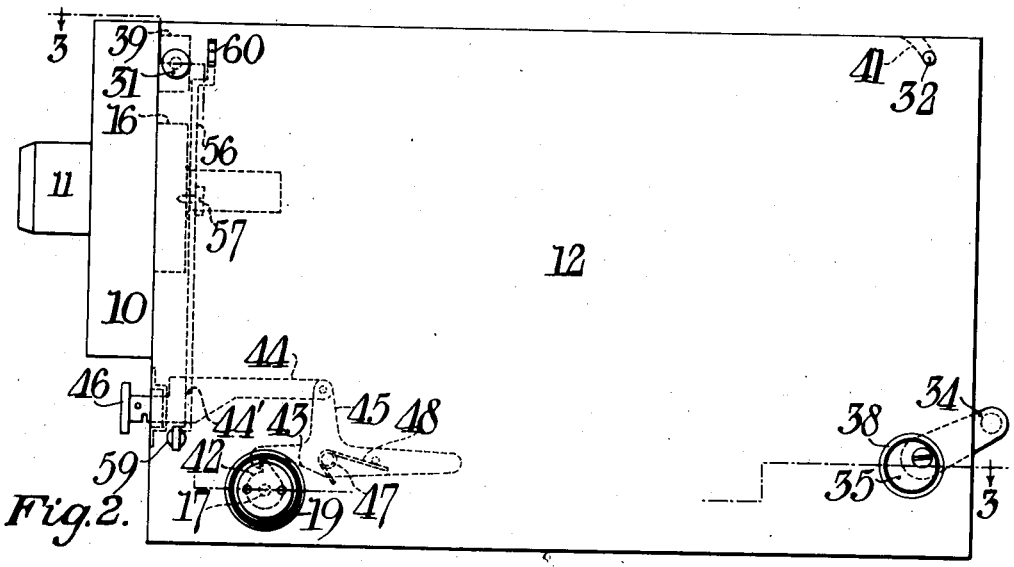
Fig. 2 is a side elevation of the camera proper with the magazine removed and illustrates the particular locking means for attaching the magazine to the camera proper.

In the illustrated embodiment of the invention, the camera proper includes the lens turret 10 supporting an objective 11 and also includes a mechanism housing 12 which is attached to the lens turret 10. The film magazine 13 is attached to the mechanism housing 12 in a manner to be later particularly described. The film magazine 13 is provided with an exposure aperture 14 in its front wall and is also provided with a locking aperture 15 in the side wall which is adjacent one side wall of the mechanism housing 12. A gear housing 16 is located within the mechanism housing 12 and contains the necessary gears, not shown, for driving and altering the opening of a rotary shutter also not disclosed. The shutter and gears for operating the same are well known in the art and for that reason a specific demonstration of their construction has not been deemed necessary, but may be found in my co-pending application Serial No. 626,917 filed June 30, 1932, for a Motion picture camera.

Figure 3:
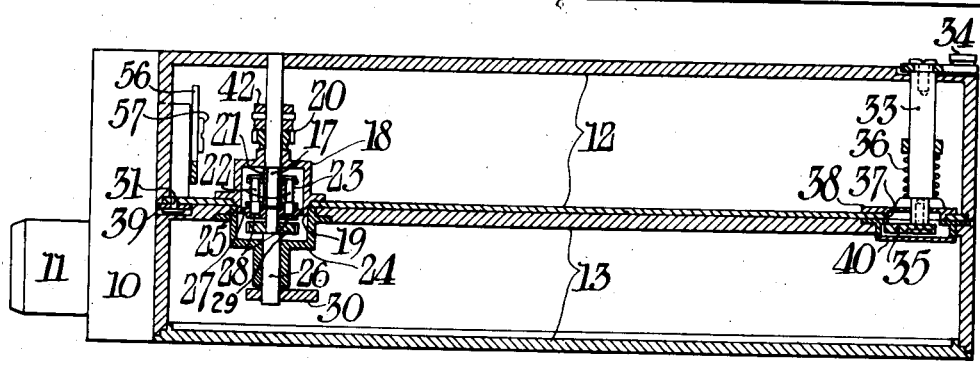
Fig. 3 is a transverse cross-section of the camera according to the invention taken on the line 3—3 of Fig. 2 and also illustrates the means for locking the camera to the magazine proper.

A shaft 17 is rotatably mounted within mechanism housing 12 and within a bushing 18, see Fig. 3, which has an annular flange 19 projecting through one side of mechanism housing 12. The shaft 17 is driven in any suitable manner, such as by a spring motor, through the pinion gear 20 which is pinned to shaft 17. A resilient detachable connection is located within bushing 18 and comprises a spider 21 attached to shaft 17, a pair of bolts 22 slidably mounted in spider 21 at different distances from the axis of shaft 17 and biased by coil springs 23 to project from the mechanism housing 12.

A second bushing 24 is located within the film magazine 13 and has an annular flange 25 adapted to fit over the annular flange 19 of the bushing 18 in the mechanism housing 12. Bushing 24 also rotatably supports a shaft 26. A disc 27 is pinned to one end of shaft 26 and is provided with a pair of holes 28 located at different distances from the axis of shaft 26 and adapted to register with the bolts 22 protruding from the bushing 18 of the camera proper. A gear 29 is fastened to shaft 26 and is adapted to drive mechanisms, such as a take-up, within the film magazine 13. An eccentric cam 30 is also fastened to shaft 26 and is adapted, upon rotation, to drive the film advancing mechanism within the film magazine 13. Thus, when film magazine 13 is located in proper position next to the mechanism housing 12, the bolts 22 will enter the holes 28 so that shafts 17 and 26 will rotate together. Due to the different spacing of each bolt 22 and each hole 28 from the axis of the respective shafts 17 and 26, these shafts will be operatively connected only in one relative position.

The particular manner of fastening the film magazine 13 to the mechanism housing 12 will now be described. A headed stud 31 is located on the exterior of mechanism housing 12 near one corner thereof. A pin 32 is located on the mechanism housing 12 at another corner thereof. An eccentric locking means is located at still another corner of the mechanism housing and comprises a shaft 33 rotatably mounted between the walls of mechanism housing 12, an operating lever 34 fastened to one end of shaft 33, an eccentric cam 35 fastened to the other end of shaft 33 and a coil spring 36 encircling shaft 33 and urging eccentric cam 35 into a recess 37 provided in a bushing 38 located in the wall of mechanism housing 12. The wall of film magazine 13 which makes surface contact with the wall of mechanism housing 12 carries a notched plate 39 which is adapted to engage the headed stud 31, carries an apertured bushing 40 which is adapted to receive the eccentric cam 35 on the end of shaft 33, and is provided with an arcuate groove 41, indicated by dotted lines in Fig. 2, which is adapted to cooperate with the pin 32 on mechanism housing 12. The film magazine 13 is placed adjacent the mechanism housing 12 at a slight angle thereto and when the annular flanges 19 and 25 have been placed in registry, the film magazine 13 is rotated into alignment with mechanism housing 12, whereupon notched plate 39 engages headed stud 31 and the end of arcuate groove 41 engages pin 32. The operating lever 34 is now pressed toward the magazine and turned downwardly so that eccentric cam 35 rotates within apertured bushing 40 and maintains the film magazine 13 in properly aligned position with the mechanism housing 12.

A clutch means for controlling the operation of the camera and which prevents operation of the camera during engagement is composed of a single toothed gear 42 pinned to shaft 17, a pawl 43 adapted to engage single toothed gear 42 and an actuating member 44 which is provided with a notch 44'. One end of actuating member 44 is pivotally connected to an arm 45 of pawl 43 while the other end of actuating member 44 extends through the front of mechanism housing 12 and is provided with a finger piece 46. The pawl 43 and arm 45 are rotatably mounted upon a shaft 47 and a coil spring 48 normally moves pawl 45 into engagement with single toothed gear 42.

Figure 1:
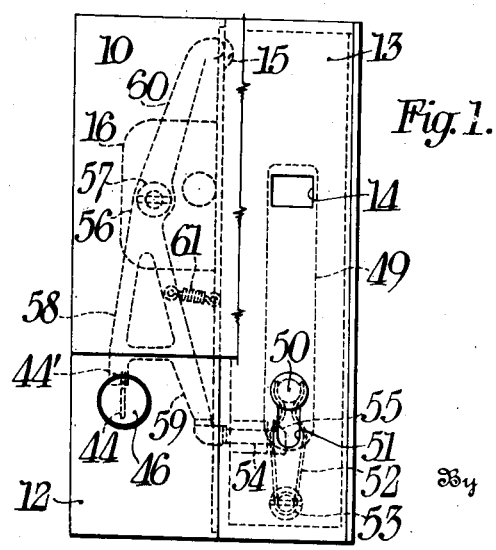
Fig. 1 is a front elevation of the motion picture camera according to the invention with a portion of the lens turret broken away for a better illustration of the magazine.

A closure means is provided preferably in the front wall of film magazine 13 and is adapted to assume either an open or closed position with respect to exposure aperture 14. Such a closure means may comprise a shutter 49 slidably mounted in the front wall of film magazine 13 and adapted to be moved downwardly and uncover exposure aperture 14 or adapted to be moved upwardly and close exposure aperture 14. An operating pin 50 is attached to shutter 49 and extends through a slot 51 to the outside of film magazine 13. The shaft of operating pin 50, indicated by the dotted circle in Fig. 1, cooperates with a spring member 52 fastened to the interior of film magazine 13 by a bolt 53 so that the shutter is resiliently maintained either in the closed position or the open position. A movable member having a surface cooperating with the surface of the shaft of operating pin 50 may be composed of a rod 54 sildably mounted in a bushing 55 within film magazine 13, having one end rounded and attached at the other end to a wedged cam 55.

A member which is adapted to be moved by the closure means, which is adapted to maintain the clutch means in engagement, and which is also adapted to prevent displacement or removal of the film magazine 13 is located within the camera housing 12. Such a lever member is provided with one portion which is adapted to engage the notch 44' in member 44 when said member is in a position corresponding to the closed position of the shutter on the film magazine, has another portion which is adapted to be flush with the exterior of the mechanism housing when said lever member is also in the position corresponding to the closed position of said shutter, and has still another portion which is adapted to engage the locking aperture 15 of the film magazine 13 only when said lever member is in a position corresponding to the open position of the shutter 49. This lever member is preferably composed of a bell crank 56 which is pivotally mounted to the rear of gear housing 16 by a bolt 57. The bell crank 56 has an arm 58 which is adapted to fit into the notch 44' when the bell crank 56 is in the position shown in Fig. 1, has an arm 59, the end of which is adapted to be flush with the exterior of mechanism housing 12 when bell crank 56 is in the position shown in Fig. 1, and has another arm 60, the end of which is adapted to fit into locking aperture 15 when the bell crank 56 is moved into a position corresponding to the open position of shutter 49. The arms of bell crank 56 correspond in function to the respective portions of the lever member. The bell crank 56 is normally held in the position shown in Fig. 1 by a coil spring 61 so that when the shutter 49 of the film magazine 13 is closed, the bell crank 56 will be normally moved to the position in which arm 58 enters into notch 44' and prevents disengagement of the closure means.

The advantages to be obtained from the corelation of the elements of a motion picture camera according to the invention will be briefly enumerated. First, the driving mechanism of the camera cannot be operated unless the film magazine 13 has been properly placed on mechanism housing 12 and shutter 49 moved to open position. Since the end of arm 59 on bell crank 56 is flush with the exterior of mechanism housing 12, the bell crank 56 cannot be readily moved to permit operation of the driving mechanism of the camera unless the foregoing conditions have been fulfilled. Second, even though the film magazine 13 is in proper position on mechanism housing 12, the driving mechanism of the camera cannot be operated until the shutter 49 has been moved to open position. Third, after the bell crank 56 has once assumed the position corresponding to the open position of the closure means, and arm 60 has entered the locking aperture 15, the bell crank 56 cannot be returned to the other position unless the clutch means is in engaging position. In other words, the film magazine 13 cannot be displaced with respect to mechanism housing 12 while the driving mechanism of the camera is in operation. Finally, a single member cooperates with the clutch means to prevent operation of the camera driving mechanism unless the closure means of the film magazine is open and also enters into engagement with the locking aperture 15 of film magazine 13 to prevent displacement of said film magazine when the closure means is in open position.

Since other modifications of the invention may be devised without departing from or exceeding the scope of my invention, the present disclosure is to be construed in an illustrative and not in a limited sense, being defined by the appended claims.

Having now particularly described my invention what I desire to secure by Letters Patent of the United States and what I claim is:

1. In a motion picture camera, the combination with a clutch means adapted upon engagement to prevent operation of the camera, a film magazine provided with an exposure aperture, and a closure means on said magazine for manual movement into closed and open positions with respect to said exposure aperture, of a means for preventing in blocking position disengagement of said clutch means and movable to said blocking position during engagement of said clutch means.

2. In a motion picture camera, the combination with a clutch means adapted upon engagement to prevent operation of the camera, a film magazine provided with an exposure aperture, and a closure means on said magazine for manual movement into closed and open positions with respect to said exposure aperture, of a means for preventing in blocking position disengagement of said clutch means and movable to said blocking position by movement of said closure means to closed position and only during engagement of said clutch means.

3. In a motion picture camera, the combination with a clutch means adapted upon engagement to prevent the operation of the camera, a film magazine provided with an exposure aperture, and a closure means on said magazine and manually movable into closed and open positions with respect to said exposure aperture, of a means movable into engagement with said clutch means to prevent disengagement of said clutch means and movable into such engagement by movement of said closure means to closed position.

4. In a motion picture camera adapted for association with a film magazine which is provided with an exposure aperture and which has a manually operated shutter for covering said exposure aperture, the combination with a clutch means adapted upon engagement to prevent the operation of the camera, of a means movable into engagement with said clutch means to prevent disengagement of said clutch means and adapted for movement into such engagement by movement of said shutter to cover said exposure aperture of the magazine.

5. In a motion picture camera, the combination with a clutch means for controlling the operation of the camera and adapted upon engagement to prevent the operation of the camera, a film magazine provided with an exposure aperture, and a closure means on said magazine and manually movable to open and closed positions with respect to said exposure aperture, of a member moved by said closure means into positions corresponding to the open and closed positions thereof, adapted in one position to engage said clutch means and prevent disengagement thereof, and adapted in the other position to engage said magazine and prevent displacement thereof.

6. In a motion picture camera adapted for association with a film magazine which is provided with an exposure aperture and which has a manually operated shutter movable to closed and open positions with respect to said exposure aperture, the combination with a clutch means for controlling the operation of the camera and adapted upon engagement to prevent the operation of the camera, of a means movable to positions corresponding to the open and closed positions of said shutter, adapted in the position corresponding to the closed position of the shutter to engage said clutch means and prevent disengagement thereof, and adapted in the other position to prevent the dissociation of said camera and magazine.

7. In a motion picture camera, the combination with a clutch means adapted upon engagement to prevent the operation of the camera, a film magazine provided with an exposure aperture, and with a locking aperture, and a closure means on said magazine and manually movable to open and closed positions with respect to said exposure aperture, of a member adapted to assume either of two positions corresponding to the positions of said closure means, adapted in the position corresponding to the closed position of said closure means to prevent disengagement of said clutch means, and adapted in the position corresponding to the open position of said closure means to prevent displacement of said magazine but permit disengagement of said clutch means.

8. In a motion picture camera, the combination with a clutch means for controlling the operation of the camera and adapted upon engagement to prevent the operation of the camera, a film magazine provided with an exposure aperture and with a locking aperture, and a closure means on said magazine and manually movable to open and closed positions with respect to said exposure aperture, of a lever member adapted to be moved by said closure means into positions corresponding to the open and closed positions of said closure means, adapted in one position to engage said clutch means and prevent disengagement thereof, and adapted in the other position to engage said locking aperture and prevent displacement of said magazine.

9. In a motion picture camera, the combination with a clutch means adapted upon engagement to prevent the operation of said camera, a film magazine provided with an exposure aperture, a closure means on said magazine and movable to open and closed position with respect to said exposure aperture, and a latching means movable to locking and unlocking positions and adapted in locking position to locate said film magazine with respect to said camera, of a means for preventing in blocking position disengagement of said clutch means and which is moved to said blocking position by movement of said latching means to unlocking position and said closure means to closed position.

10. In a motion picture camera, the combination with a clutch means adapted upon engagement to prevent the operation of the camera, a film magazine provided with an exposure aperture and with a locking aperture, and a closure means movable to open and closed positions with respect to said exposure aperture, of a bell crank member adapted to be moved by said closure means into positions corresponding to the open and closed positions of said closure means, having one portion adapted in one position of said member to engage said clutch means and prevent disengagement thereof, and having another portion adapted in the other position of said member to engage said locking aperture and prevent displacement of said magazine.

11. In a motion picture camera, the combination with a clutch means for controlling the operation of the camera and adapted upon engagement to prevent operation of the camera and including a movable member provided with a notch, and a film magazine including a movable member, of a lever member adapted to engage said notch and prevent disengagement of said clutch means but adapted to be moved out of engagement with said notch only by said movable member of the magazine.

12. In a motion picture camera, the combination with a mechanism housing and a clutch means adapted upon engagement to prevent operation of the camera and including a movable member provided with a notch, of a lever adapted to engage said notch and having a portion flush with the exterior of said housing during engagement between the clutch means and said lever, said lever being adapted to be moved out of engagement with said clutch means by a movable member of a film magazine.

13. In a motion picture camera, the combination with a mechanism housing, a clutch means adapted upon engagement to prevent operation of the camera and including a member provided with a notch, a film magazine provided with an exposure aperture and with a locking aperture, a shutter movable into open and closed positions with respect to said exposure aperture, a movable member in said magazine, and cooperating surfaces on said movable member and said shutter, of a lever member normally held in a position corresponding to the closed position of said shutter but adapted to be moved by said movable member into the position corresponding to the open position of said shutter, having one portion adapted to engage said notch and another portion adapted to be flush with the exterior of said housing when said lever member is in the position corresponding to the closed position of said shutter, and having another portion adapted to engage said locking aperture, said first mentioned portion disengaging said notch, when said lever member is in the position corresponding to the open position of said shutter.

OTTO WITTEL.